United States Patent
Schwartz et al.

(10) Patent No.: US 12,411,950 B2
(45) Date of Patent: *Sep. 9, 2025

(54) TECHNIQUES FOR SEMANTIC ANALYSIS OF CYBERSECURITY EVENT DATA AND REMEDIATION OF CYBERSECURITY EVENT ROOT CAUSES

(71) Applicant: Dazz, Inc., San Francisco, CA (US)

(72) Inventors: Tomer Schwartz, Tel Aviv (IL); Eshel Yaron, Amsterdam (NL); Barak Bercovitz, Even-Yehuda (IL)

(73) Assignee: Wiz, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/058,833

(22) Filed: Feb. 20, 2025

(65) Prior Publication Data

US 2025/0190555 A1 Jun. 12, 2025

Related U.S. Application Data

(63) Continuation of application No. 17/507,180, filed on Oct. 21, 2021.

(51) Int. Cl.
*G06F 21/55* (2013.01)
*G06F 8/70* (2018.01)
(Continued)

(52) U.S. Cl.
CPC .............. *G06F 21/554* (2013.01); *G06F 8/70* (2013.01); *G06F 16/245* (2019.01);
(Continued)

(58) Field of Classification Search
CPC ........ G06F 21/554; G06F 8/70; G06F 16/245; G06F 16/9024; G06F 40/242; G06F 40/30; G06F 2221/033
See application file for complete search history.

(56) References Cited

U.S. PATENT DOCUMENTS 8,806,425 B1 8/2014 Willis et al.
9,052,961 B2 6/2015 Mangtani et al.
(Continued)

FOREIGN PATENT DOCUMENTS

EP 3208996 A1 8/2017
EP 3494506 A1 6/2019
WO 2023067423 A1 4/2023

OTHER PUBLICATIONS

Doan TP, Jung S. Davs: Dockerfile Analysis for Container Image Vulnerability Scanning. CMC—Computers Materials & Continua. Jan. 1, 2022;72(1):1699-711. Jan. 1, 2022 (Jan. 1, 2022).

(Continued)

*Primary Examiner* — Huan V Doan
(74) *Attorney, Agent, or Firm* — M&B IP Analysts, LLC (57) ABSTRACT

A system and method for remediating cybersecurity events. A method includes creating a semantic concepts dictionary defining semantic concepts representing characteristics of software components. An entity graph is created based on correlations between entities, where the entity graph has nodes representing respective entities and the entities include software components of a software infrastructure as well as event logic components of cybersecurity event logic deployed with respect to the software infrastructure. A knowledge base is built such that the knowledge base includes the semantic concepts dictionary and the entity graph. The knowledge base is queried using a query generated based on one or more semantic concepts and one or more entity-identifying values extracted from cybersecurity event data. The query includes at least one semantic concept and at least one entity-identifying value. One or more remedial actions are performed based on one or more query results from the knowledge base.

19 Claims, 6 Drawing Sheets

(51) Int. Cl.
   *G06F 16/245*   (2019.01)
   *G06F 16/901*   (2019.01)
   *G06F 40/242*   (2020.01)
   *G06F 40/30*    (2020.01)

(52) U.S. Cl.
   CPC ........ *G06F 16/9024* (2019.01); *G06F 40/242* (2020.01); *G06F 40/30* (2020.01); *G06F 2221/033* (2013.01)

(56) References Cited

U.S. PATENT DOCUMENTS

| | | | |
|---|---|---|---|
| 9,449,042 | B1 | 9/2016 | Evans et al. |
| 10,108,803 | B2* | 10/2018 | Chari .................. G06F 21/577 |
| 11,429,353 | B1 | 8/2022 | Liguori et al. |
| 11,893,106 | B2 | 2/2024 | Kim et al. |
| 2003/0131284 | A1 | 7/2003 | Flanagan et al. |
| 2009/0222479 | A1 | 9/2009 | Burukhin et al. |
| 2010/0070448 | A1 | 3/2010 | Omoigui |
| 2013/0167241 | A1 | 6/2013 | Siman |
| 2015/0341214 | A1 | 11/2015 | Croy et al. |
| 2015/0347759 | A1* | 12/2015 | Cabrera ................ G06F 21/577 726/25 |
| 2015/0363197 | A1 | 12/2015 | Carback et al. |
| 2016/0379480 | A1 | 12/2016 | OlmstedThompson et al. |
| 2017/0075749 | A1 | 3/2017 | Ambichl et al. |
| 2017/0185785 | A1 | 6/2017 | Vorona et al. |
| 2017/0249128 | A1 | 8/2017 | Fojtik et al. |
| 2017/0286692 | A1 | 10/2017 | Nakajima et al. |
| 2018/0025160 | A1 | 1/2018 | Hwang et al. |
| 2018/0129479 | A1 | 5/2018 | McPherson et al. |
| 2018/0285199 | A1 | 10/2018 | Mitkar et al. |
| 2018/0321918 | A1 | 11/2018 | Mcclory et al. |
| 2018/0373507 | A1 | 12/2018 | Mizrahi et al. |
| 2019/0007290 | A1 | 1/2019 | He et al. |
| 2019/0068622 | A1 | 2/2019 | Lin et al. |
| 2019/0294477 | A1 | 9/2019 | Koppes et al. |
| 2019/0303579 | A1 | 10/2019 | Reddy et al. |
| 2019/0354389 | A1 | 11/2019 | Du et al. |
| 2020/0097662 | A1 | 3/2020 | Hufsmith et al. |
| 2020/0183766 | A1 | 6/2020 | Kumar-Mayernik et al. |
| 2020/0296117 | A1 | 9/2020 | Karpovsky et al. |
| 2021/0042096 | A1 | 2/2021 | White, III et al. |
| 2021/0168165 | A1 | 6/2021 | Alsaeed et al. |
| 2021/0182387 | A1 | 6/2021 | Zhu et al. |
| 2021/0311855 | A1 | 10/2021 | Khan et al. |
| 2021/0382997 | A1 | 12/2021 | Yi et al. |
| 2022/0114023 | A1 | 4/2022 | Choksi et al. |
| 2022/0129539 | A1 | 4/2022 | Walsh et al. |
| 2022/0311794 | A1 | 9/2022 | Maya et al. |
| 2022/0327220 | A1 | 10/2022 | Sharma et al. |
| 2022/0353341 | A1 | 11/2022 | Östrand et al. |
| 2023/0036739 | A1 | 2/2023 | Deppisch et al. |
| 2023/0118065 | A1 | 4/2023 | Kumar |
| 2023/0229781 | A1 | 7/2023 | Stolbikov et al. |
| 2023/0297366 | A1 | 9/2023 | Wigglesworth et al. |
| 2023/0333845 | A1 | 10/2023 | Zand et al. |
| 2025/0013442 | A1 | 1/2025 | Hempstead et al. |

OTHER PUBLICATIONS

International Search Report for PCT Application No. PCT/IB2022/059483. The International Bureau of WIPO.
International Search Report for PCT application PCT/IB2023/052413 dated Jun. 12, 2023. The International Bureau of WIPO.
International Search Report for PCT/IB2023/057511, dated Nov. 2, 2023. Searching Authority Israel Patent Office, Jerusalem, Israel.
International Search Report, PCT/IB2023/052415; Israel Patent Office, Jerusalem. Dated Jun. 14, 2023.
Written Opinion of the International Searching Authority for PCT Application No. PCT/IB2022/059483 dated Jan. 8, 2023. The International Bureau of WIPO.
Written Opinion of the International Searching Authority, PCT/IB2023/052415. Israel Patent Office, Jerusalem. Dated Jun. 14, 2023.
Written Opinion of the Searching Authority for PCT application PCT/IB2023/052413 dated Jun. 12, 2023. The International Bureau of WIPO.
Written Opinion of the Searching Authority for PCT/IB2023/057511, dated Nov. 2, 2023. Searching Authority Israel Patent Office, Jerusalem, Israel.
International Search Report for PCT/IB2025/051650, dated May 26, 2025. Searching Authority, Israel Patent Office, Jerusalem, Israel.
Written Opinion of the Searching Authority for PCT/IB2025/051650, dated May 26, 2025. Searching Authority, Israel Patent Office, Jerusalem, Israel.
Alrabaee, "A Survey of Binary Code Fingerprinting Approaches: Taxonomy, Methodologies, and Features", 2022, ACM (Year: 2022).
Liu, "Vfdetect: A Vulnerable Code Clone Detection System Based on Vulnerability Fingerprint", 2017, IEEE (Year: 2017).

\* cited by examiner

TECHNIQUES FOR SEMANTIC ANALYSIS OF CYBERSECURITY EVENT DATA AND REMEDIATION OF CYBERSECURITY EVENT ROOT CAUSES

CROSS-REFERENCE TO RELATED APPLICATIONS

This application is a continuation of U.S. patent application Ser. No. 17/507,180 filed on Oct. 21, 2021, now pending, the contents of which are hereby incorporated by reference.

TECHNICAL FIELD

The present disclosure relates generally to remediation of cybersecurity events caused by issues related to software infrastructure, and more specifically to semantically analyzing cybersecurity event data with respect to software infrastructure.

BACKGROUND

With the ever-evolving digital transformation businesses, the software development lifecycle has become a crucial component of many successful businesses. While the increased amount of software being utilized promises great improvements in how services are delivered, software development remains a persistent challenge. In particular, due to development velocity rapidly increasing, software is being created and deployed faster than ever, and software infrastructure must often be expanded rapidly to accommodate. As more software is created, ways to identify and address problems during software development and, more specifically, automated tools to aid in such remediation, are becoming increasingly desirable.

Additionally, due to the large amount of software being created and the significant investments in delivery automation powered by DevOps, complex continuous integration/continuous delivery (CI/CD) pipelines that use on-premises or cloud-native technologies to build, deploy, and control the entire application stack have been adopted. These pipelines can control everything from infrastructure to business logic, and the interactions between components in the software environment can no longer be effectively managed manually by human operators alone. As a result of these issues, security teams in companies are seeing increased business risk and employee burnout. Further, companies face challenges in effectively mitigating risks once security vulnerabilities have been introduced via newly created flawed software.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for remediating cybersecurity events. The method comprises: querying a knowledge base using a query generated based on at least one semantic concept and at least one entity-identifying value extracted from cybersecurity event data indicating a cybersecurity event for a software infrastructure, wherein the knowledge base includes an entity graph, wherein the entity graph has a plurality of nodes representing respective entities of a plurality of entities, wherein the plurality of entities includes a plurality of software components of the software infrastructure and a plurality of event logic components of cybersecurity event logic deployed with respect to the software infrastructure; identifying at least one path in the entity graph based on results of the query, wherein each identified path is between one of the plurality of software components and one of the plurality of event logic components; identifying at least one root cause entity based on the identified at least one path; and performing at least one remedial action based on the identified at least one root cause entity.

Certain embodiments disclosed herein also include a non-transitory computer readable medium having stored thereon causing a processing circuitry to execute a process, the process comprising: querying a knowledge base using a query generated based on at least one semantic concept and at least one entity-identifying value extracted from cybersecurity event data indicating a cybersecurity event for a software infrastructure, wherein the knowledge base includes an entity graph, wherein the entity graph has a plurality of nodes representing respective entities of a plurality of entities, wherein the plurality of entities includes a plurality of software components of the software infrastructure and a plurality of event logic components of cybersecurity event logic deployed with respect to the software infrastructure; identifying at least one path in the entity graph based on results of the query, wherein each identified path is between one of the plurality of software components and one of the plurality of event logic components; identifying at least one root cause entity based on the identified at least one path; and performing at least one remedial action based on the identified at least one root cause entity.

Certain embodiments disclosed herein also include a system for remediating cybersecurity events. The system comprises: a processing circuitry; and a memory, the memory containing instructions that, when executed by the processing circuitry, configure the system to: query a knowledge base using a query generated based on at least one semantic concept and at least one entity-identifying value extracted from cybersecurity event data indicating a cybersecurity event for a software infrastructure, wherein the knowledge base includes an entity graph, wherein the entity graph has a plurality of nodes representing respective entities of a plurality of entities, wherein the plurality of entities includes a plurality of software components of the software infrastructure and a plurality of event logic components of cybersecurity event logic deployed with respect to the software infrastructure; identify at least one path in the entity graph based on results of the query, wherein each identified path is between one of the plurality of software components and one of the plurality of event logic components; identify at least one root cause entity based on the identified at least one path; and perform at least one remedial action based on the identified at least one root cause entity.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In light of the challenges in increasingly rapid and complex software development noted above, it has been identified that tools which allow for more visibility into the software development lifecycle can be utilized to allow for automating detection of potential issues caused during software development, maintenance, or operation. More specifically, it has been identified that information contained in cybersecurity event data such as data related to software errors can be utilized in combination with information about logic utilized by the software development infrastructure in order to automate identification of root causes and remediation steps to mitigate problems indicated in the cybersecurity event data.

To this end, the disclosed embodiments provide a knowledge base containing data mapping entities in different domains and semantic concepts which may be indicated in cybersecurity event data included in sources such as alerts, logs, and the like. The disclosed embodiments further provide enhanced visibility into the software development process and corresponding techniques for utilizing the knowledge base in order to identify the root cause of an incoming cybersecurity event, thereby allowing for automating such root cause analysis. Accordingly, the disclosed embodiments provide techniques for improving security of the software infrastructure.

Further, it has been identified that, even if human operators are theoretically capable of identifying root causes, the manual process for identifying root causes by a human operator relies on subjective evaluations of connections based on the operator's understanding of the software infrastructure. This subjective process can lead to human operators missing potential connections, thereby leaving vulnerabilities exposed. Additionally, the results of such manual analysis can vary between individuals. In particular, differences in identifiers used by different teams (e.g., security and engineering teams) for the same entities may cause confusion and result in inconsistent interpretations of cybersecurity events and, consequently, identified root causes.

The various disclosed embodiments include methods and systems for creating and utilizing a knowledge base including both semantic concepts and entity-identifying values associated with respective software components of software infrastructure. Root causes of a cybersecurity event are identified using data stored in the knowledge base with respect to information indicated in the cybersecurity event. The root causes may be in the form of entities among software infrastructure such that appropriate remedial actions may be performed with respect to those entities, thereby improving security of the software infrastructure. The entities may be software components deployed in the software infrastructure.

In another embodiment, a knowledge base is built. In such an embodiment, correlations between software components are derived based on data related to the software infrastructure containing those software components, source control is linked to application binaries, and log data is analyzed. Based on the correlation, linking, and analysis, an entity graph which maps the software infrastructure including connections among software components acting as entities of the entity graph. The entity graph further includes entity-identifying values representing specific entities such as, but not limited to, resource name, unique identifier, and the like. A semantic concepts dictionary is created. The semantic concepts definition defines at least types of entities in the software infrastructure. As a non-limiting example, a Docker container may be defined as an entity having particular characteristics.

A knowledge base is built to include the entity graph and the semantic concepts dictionary. The knowledge base can be queried with respect to entity-identifying values indicative of entities in the software infrastructure, semantic concepts identified in cybersecurity event data, or both, in order to identify paths connecting between event logic component entities and software component entities such as, for example, policies which trigger cybersecurity events and software components which contain errors that cause cybersecurity events to trigger.

The software components are discrete logical components of the software infrastructure and may include, but are not limited to, files, software containers, software layers, repositories, commits, binaries, pipelines, production assets, servers, workloads, databases, security tools (e.g., source code inspection tools, binary inspection tools, runtime environment observation tools, etc.), configuration definitions, scripts, modules, libraries, combinations thereof, portions thereof, and the like. Any of the software components may be contained in discrete hardware components or may be logical components stored on the same hardware component. Changes to the code, configuration, or both, of any given software component, or changes to the software component itself, may propagate to a cloud or other network environment, thereby causing issues in that environment which trigger cybersecurity events. The triggering of cybersecurity events may be reflected in sources of cybersecurity event data such as, but not limited to, alerts, logs, and the like. Such cybersecurity event sources are typically generated by scanning tools that can only identify limited information about the source of cybersecurity events and, as a result, it has been identified that there is a need to provide further insight into the software infrastructure.

In some implementations, the entities in the entity graph may further include nodes representing code owners (e.g., engineers or programmers who wrote or are otherwise responsible for code in any of the software components) based on predetermined information about the person or people responsible for each code. Such code owner nodes allow for identifying the person responsible for a given cybersecurity event and may be utilized to determine which device notifications regarding root cause entities should be provided. This, in turn, allows for accurately and automatically identifying the best person to investigate or correct any given issue related to the cybersecurity event. Alternatively or collectively, the entities in the entity graph may further include nodes representing other members of the infrastructure team, the development operations team, or the operations team.

The disclosed embodiments provide visibility into the development operations (DevOps) pipeline of an organization's software infrastructure and allow for automated or semi-automated (e.g., automated but requiring human approval) remediation of issues which trigger cybersecurity events. The entity graph and semantic concepts may be defined with respect to various entities and concepts of the software development life cycle (SDLC) such that the disclosed embodiments may be integrated across the SDLC in order to allow for enforcing policies throughout the SDLC. The disclosed embodiments can be initially utilized during software development in order to identify issues in real-time as software is developed and promoted.

Additionally, the automated remediation made possible by the disclosed embodiments allows for scaling up remediation efforts in a manner that is not feasible using human operators alone. In this regard, it is noted that manual remediation of just a few alerts can take a human operator an entire day, but that modern software infrastructures may experience tens of thousands of cybersecurity events in a given day. Thus, it is not practically possible to keep up with the number of remediations that might be necessary in a given day using human operators. An automated remediation process using a knowledge base and analyzing cybersecurity event data as described herein can be effectively scaled to the astronomical number of cybersecurity events that modern software infrastructures must contend with.

Figure 1:
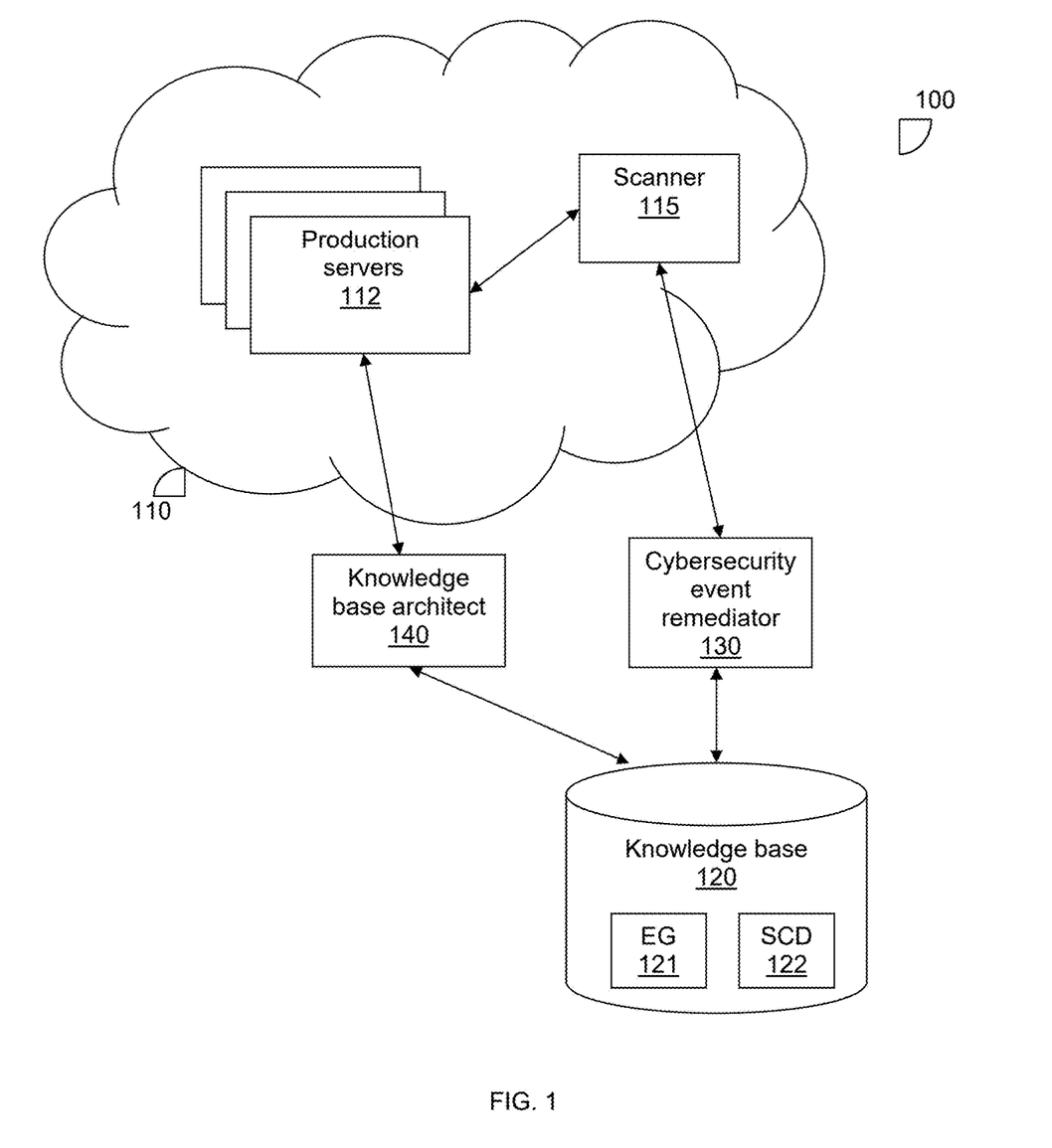
FIG. 1 is a network diagram utilized to describe various disclosed embodiments.

FIG. 1 shows an example network diagram 100 utilized to describe the various disclosed embodiments. The example network diagram 100 illustrates a cloud computing platform 110, a knowledge base 120, a cybersecurity event remediator 130, and a knowledge base architect 140. The cloud computing platform 110 may be realized via one or more networks such as, but not limited to, a wireless, cellular or wired network, a local area network (LAN), a wide area network (WAN), a metro area network (MAN), the Internet, the worldwide web (WWW), similar networks, and any combination thereof.

The cloud computing platform 110 includes production servers 112 and one or more scanners 115. The production servers 112 may be configured to deploy and host web applications uploaded to the cloud computing platform 110 by one or more software developer devices (not shown). The scanners 115 are configured to scan the cloud computing platform 110, binary artifacts, code, combinations thereof, and the like, and are configured to generate cybersecurity event data related to network activity, potential sources of cybersecurity events, intermediate representations of such potential sources, resulting artifacts of the software development process, combinations thereof, and the like. To this end, the scanners 115 may include, but are not limited to, cloud scanners, application security scanners, linting tools, combinations thereof, and any other security validation tools that may be configured to monitor network activities or potential sources of cybersecurity events.

Any cloud scanners among the scanners 115 are configured to monitor for network activities and are configured to generate sources of cybersecurity event data. To this end, such cloud scanners may be configured to monitor network activity and to generate logs of such network activity, or may be configured to monitor suspicious behavior and to generate alerts when such suspicious behavior is identified. The alerts may include information about the events, entities, or both, that triggered the alerts.

The cybersecurity event data included in the cybersecurity event data sources may be provided, for example, in the form of textual data. Such textual data may be analyzed using natural language processing and a semantic concepts dictionary in order to identify entity-identifying values representing specific entities in software infrastructure which are related to the cybersecurity events, semantic concepts indicating types or other information about entities related to the cybersecurity events, both, and the like.

The knowledge base 120 stores data used for cybersecurity event remediation. Such data includes, but is not limited to, an entity graph (EG) 121 and a semantic concepts dictionary (SCD) 122. The entity graph 121 is a graph linking nodes representing entity-identifying values of specific entities such as, but not limited to, resource names, unique identifiers, and the like. The semantic concepts dictionary 122 includes definitions of semantic concepts indicating semantic information about entities such as, but not limited to, types of entities (e.g., Docker container).

The entity graph 121 provides an end-to-end view of all domains of the software infrastructure including connections between components of those domains, thereby establishing potential connections between any two given components in the software infrastructure and their respective domains. To this end, the entity graph 121 includes schematic data linking different domains and demonstrating linkages within each domain. The domains include domains representing various layers of the software infrastructure as well as domains representing event logic components (e.g., policies, code defining business logic, queries, etc.) related to cybersecurity events. By graphing domains including both portions of the software infrastructure and event logic components related to cybersecurity events which may be triggered with respect to the software infrastructure, the entity graph 121 can be queried in order to determine paths of nodes connecting entities to event logic components, thereby establishing the root cause of any given cybersecurity event as the entity connected to the event logic components related to the cybersecurity event.

In an embodiment, the cybersecurity event remediator 130 is configured to remediate cybersecurity events based on entity-identifying values and semantic concepts identified based on cybersecurity event data (e.g., data indicated in alerts or logs generated by the cloud scanners 115). The remediation is based on analysis of such cybersecurity events with respect to data stored in the knowledge base 120. More specifically, the analysis may include matching data in the knowledge base 120 to results of a semantic analysis of the cybersecurity event data, to entity-identifying values included in the cybersecurity event data, or both. Based on the matching and the entity graph 121, a root cause of the cybersecurity event may be determined. An example method for remediating cybersecurity events which may be performed by the cybersecurity event remediator 130 is described further below with respect to FIG. 2. An example schematic diagram of the cybersecurity event remediator 130 is described further below with respect to FIG. 4.

In an embodiment, the knowledge base architect 140 is configured to populate the knowledge base 120 with data to be used by the cybersecurity event remediator 130 including, but not limited to, the entity graph 121 and the semantic concepts dictionary 122. An example method for creating a knowledge base which may be performed by the knowledge base architect 140 is described further below with respect to FIG. 3.

In another embodiment, the knowledge base architect 140 may be configured to determine potential alerts which may be caused by errors in files based on the entity graph 121 when the files are used (e.g., executed or accessed) or to otherwise determine potential cybersecurity event data (e.g., logs or portions thereof) based on the same. The potential alerts may be determined based on the entity graph 121 and, more specifically, by identifying paths between a file containing errors and one or more policies which would be triggered by the error-containing file. Accordingly, the knowledge base architect 140 may provide an automated process of proactively notifying users of files in order to prevent foreseeable alerts. An example method for determining potential alerts based on entity-identifying values and semantic concepts is described further below with respect to FIG. 6.

An example schematic diagram of the knowledge base architect 140 is described further below with respect to FIG. 5.

It should be noted that the example network diagram depicted in FIG. 1 illustrates a particular arrangement of communicating components merely for simplicity purposes, but that the disclosed embodiments are equally applicable to different cloud computing configurations. As a non-limiting example, any of the knowledge base 120, the cybersecurity event remediator 130, and the knowledge base architect 140 may be deployed in the cloud computing platform 110 without departing from the scope of the disclosure. Additionally, the monitored software may be deployed in an infrastructure other than a cloud computing infrastructure such as, but not limited to, an on-premises infrastructure.

Figure 2:
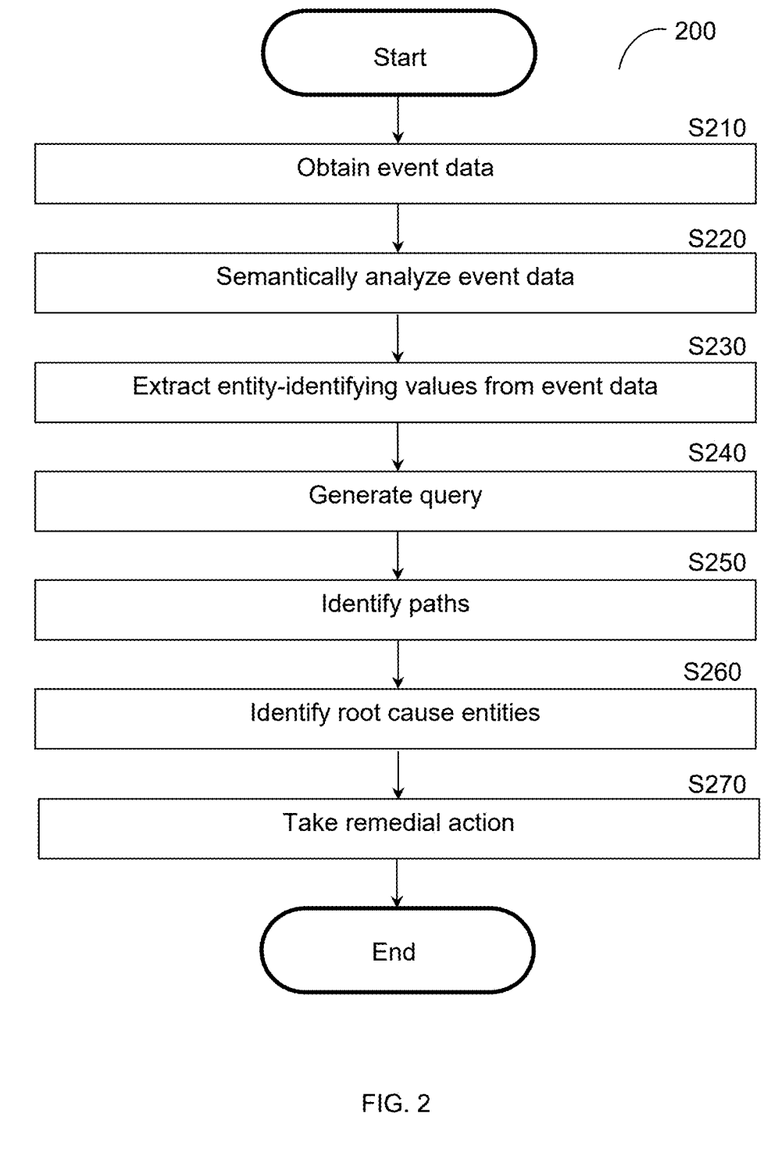
FIG. 2 is a flowchart illustrating a method for remediating cybersecurity events based on infrastructure values and semantic concepts according to an embodiment.

FIG. 2 is a flowchart 200 illustrating a method for remediating cybersecurity events based on entity-identifying values and semantic concepts according to an embodiment. In an embodiment, the method is performed by the cybersecurity event remediator 130, FIG. 1.

At S210, cybersecurity event data is obtained. The cybersecurity event data may be ingested from a scanner (e.g., one of the scanners 115, FIG. 1) and may relate to network activity, configurations of potential sources of cybersecurity events, data included in potential sources of cybersecurity events, combinations thereof, and the like. Alternatively, the cybersecurity event data may be received, for example, from a user device of a user reporting an alert. The cybersecurity event data may include, but is not limited to, alerts, logs, combinations thereof, portions thereof, and the like.

In some embodiments, the cybersecurity event may be a simulated cybersecurity event or otherwise the cybersecurity event data may be simulated cybersecurity event data such that the method may begin even if an actual cybersecurity event has not yet occurred (e.g., before an alert has triggered or otherwise before the cybersecurity event is indicated in cybersecurity event data). Such simulated data may be provided via user inputs, may be randomly generated, and the like. Using simulated cybersecurity events allows for proactively testing the software infrastructure, which in turn can be utilized to remediate problems before the software infrastructure actually experiences those problems.

At S220, the cybersecurity event data is semantically analyzed. In an embodiment, S220 includes extracting semantic keywords from textual content included in the cybersecurity event data. Such textual content may include, but is not limited to, text of an alert or log, text of a policy or other event logic component linked to a cybersecurity event (e.g., code defining detection logic used to detect the cybersecurity event, a query which resulted in the alert triggering, etc.), a machine readable representation of an alert (e.g., a JSON or XML representation of the alert), combinations thereof, and the like. To this end, in a further embodiment, S220 may further include performing natural language processing on such text in order to identify known semantic concepts (e.g., semantic concepts defined in a semantic concepts dictionary) and to extract the identified semantic concepts. Alternatively or collectively, S220 may further include mapping from tokens of a machine readable representation to semantic concepts, where the mapping may be explicitly defined or learned using machine learning.

At S230, entity-identifying values are extracted from the cybersecurity event data. In an embodiment, S230, includes applying one or more entity identification rules in order to identify the values to be extracted from the cybersecurity event data. Such rules may define, for example but not limited to, fields that typically contain entity-identifying values, common formats of entity-identifying values, other indicators of a value that represents a specific entity, and the like. The entity-identifying values may include, but are not limited to, values which identify a specific entity, values which indicate groups to which an entity belongs (e.g., a name of a resource group to which the entity belongs), both, and the like. Alternatively or collectively, a machine learning model trained to extract entity-identifying values may be applied to the cybersecurity event data.

At S240, a query is generated and applied based on the semantic analysis and the entity-identifying values. In an embodiment, the query includes both one or more semantic concepts as well as one or more entity-identifying values.

The query may be generated based on a predetermined query language. Such a query language may be designed for the purpose of harnessing logical deduction rules for querying entity graphs or relational databases in order to obtain relevant information for development, security, and operations for the various domains of a software infrastructure. Alternatively, the query may be generated in a general purpose query language. In some implementations, the query language may be custom-defined to allow for customization of queries for a specific environment (e.g., a cloud environment used by a specific company) in a manner that can scale up to different stacks.

In an embodiment, the query is applied using a fuzzy matching process based on a predetermined template. The fuzzy matching process yields results indicating an event logic component (e.g., a policy, code defining business logic, a query, a portion thereof, etc.) and a software component entity among the entity graph that most closely matches the event logic component and software component entities indicated in the text of the cybersecurity event data.

It should be noted that steps S220 through S240 are described in some embodiments as being potentially performed when an alert has already been received, but that the disclosed embodiments are not limited to such an implementation. In particular, an alert may be semantically analyzed prior to the alert actually being triggered, for example by using the alert as simulated cybersecurity event data. In this regard, it is noted that some forms of cybersecurity event data such as alerts may use predetermined text that is included in notifications when the alert is generated. Accordingly, such predetermined text can be semantically analyzed before the alert is actually received, and the results of the prior semantic analysis may be used as described herein.

At S250, one or more paths between a discrete portion of event logic related to the cybersecurity event and an entity in a software infrastructure are identified based on the results of the query. As noted above, the generated query includes both semantic concepts and entity-identifying values extracted from the cybersecurity event data, which indicates both entities involved in the event that resulted in the cybersecurity event data being generated or provided and the event logic related to the cybersecurity event (e.g., event logic of a policy which triggered an alert for the cybersecurity event, business logic which was used to generate log data indicating the cybersecurity event, queries about the cause of a cybersecurity event, etc.). Using these concepts and values to query the entity graph allows for identifying paths between specific entities of the software infrastructure and event logic related to the cybersecurity event.

In some implementations, multiple paths are identified between the event logic component and the software component, and one or more root cause paths are determined as the paths to use for subsequent processing. Each root cause path may be, for example but not limited to, a shortest path among paths (e.g., one of the paths having the fewest links connecting nodes from a node representing a policy indicated by an alert to a node representing the entity indicated in the cybersecurity event data).

At S260, one or more root cause entities are identified based on the paths. The root cause entities may be entities associated with event logic related to the cause of a cybersecurity event indicated in the cybersecurity event data such as, but not limited to, each software component of the software infrastructure that is connected to a policy which triggered an alert via the identified at least one path. The root cause entities are collectively determined as the root cause of the cybersecurity event. As a non-limiting example, a root cause entity may be an entity containing faulty code (e.g., a file or container) which caused an alert to trigger. By identifying the entities which are the root cause of a cybersecurity event, more accurate and specific information about the cause of the cybersecurity event can be provided, and appropriate remedial actions involving those entities may be determined.

At S270, remedial action is taken with respect to the identified root cause entities. The remedial action may include, but is not limited to, generating and sending a notification, performing mitigation actions such as changing configurations of software components, changing code of software components, combinations thereof, and the like. As a non-limiting example, a configuration of a root cause entity that is a software component may be changed from "allow" to "deny" with respect to a particular capability of the software component, thereby mitigating the cause of the cybersecurity event. In some embodiments, S270 includes following a list of steps to fix underlying issues with the root cause entities.

When the remedial action includes generating a notification, S270 may further include determining to which person the notification should be sent. In implementations where the entity graph includes nodes representing code owners, such person to which the notification should be sent may be a person, team, business unit, and the like, represented by a node linked to the root cause entity in the entity graph. As noted above, by using known links between software components and code owners, an appropriate person to investigate or fix an issue can be automatically and accurately identified.

Additionally, when the remedial action includes generating a notification, the notification may further indicate a degree of risk of the underlying issue. Such a degree of risk may be determined based on, for example, the semantic analysis of the cybersecurity event data, text of the cybersecurity event data, a known risk level associated with event logic components related to the cybersecurity event indicated in the cybersecurity event data, a predetermined degree of importance of the root cause entities, a number of edges connecting the root cause entities to other software components of the entity graph, a number of edges connecting an entity in the path to a known security risk, a combination thereof, and the like. Such a degree of risk may serve to demonstrate the urgency needed for responding to the issue to a user being notified of the issue, which may help in determining how to prioritize fixing the issue.

Figure 3:
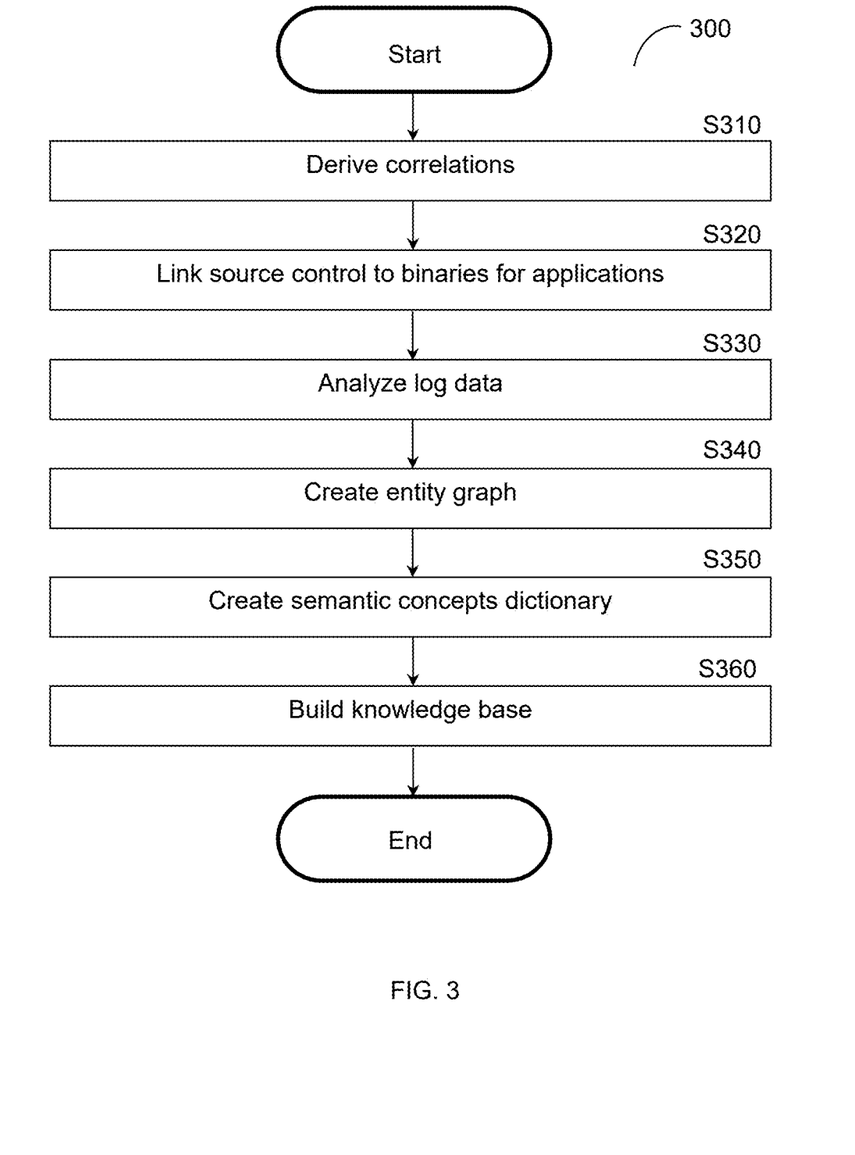
FIG. 3 is a flowchart illustrating a method for creating a knowledge base of semantic concepts and infrastructure values according to an embodiment.

FIG. 3 is a flowchart 300 illustrating a method for creating a knowledge base of semantic concepts and entity-identifying values according to an embodiment. In an embodiment, the method is performed by the knowledge base architect 140, FIG. 1.

At S310, correlations between software components are derived by analyzing software development lifecycle (SDLC) pipeline data (e.g., data of a continuous integration [CI] and continuous delivery [CD] pipeline). Such SDLC data may include, but is not limited to, a pipeline configuration, build scripts, source code, combinations thereof, portions thereof, and the like. The correlations are identified based on references between software components indicated in such data, static analysis of software components, semantic analysis of text related to the software components, combinations thereof, and the like.

At S320, source control is linked to binaries of one or more applications based on the derived correlations. In an embodiment, S320 includes extracting uniquely identifying features of the source control artifact and binaries from the analyzed data. In a further embodiment, the linking is limited to pairs of binaries and source control artifacts selected from limited set of binaries and source control artifacts, respectively.

At S330, log data (e.g., log files) is analyzed for additional correlations. To this end, S330 may include identifying actions taken by software components and events which may be caused by those actions. These relationships may be identified based on circumstances such as, but not limited to, events occurring shortly after those actions, determinations that events which could logically have been caused by the actions, combinations thereof, and the like. The identification of S330 may be based on probabilistic analysis such that, for example, correlations having likelihoods above a threshold are identified.

As a non-limiting example, by analyzing log files from an integration or deployment server, links between code commits and binary hashes (and, consequently, the corresponding entities involved) may be identified. As another non-limiting example, by analyzing of files in a cloud environment, information identifying entities used by automation engines may be identified.

In this regard, it has been identified that correlations indicated between log files can demonstrate that particular deployments occurred previously, which in turn aids in providing visibility to the DevOps pipeline in situations where static analysis will not satisfy the constraints, and may further aid in finding hidden automation. This, in turn, provides additional information about relationships between software components and entity logic components which can be utilized in some non-limiting examples to more accurately identify root causes as discussed above with respect to FIG. 2.

At S340, an entity graph is created based on the correlations identified at S310 through S330. The entity graph includes nodes and edges. The nodes represent distinct logical entities such as, but not limited to, software components, event logic components, and the like. The edges connect entities based on the correlations identified at S310 through S330. The edges therefore represent relationships between pairs of entities, which in turn form paths as one navigates from a first entity to a second, from the second to a third, and so on. The paths following edges between nodes may therefore be utilized to identify connections between different entities (e.g., between event logic components and software components), thereby allowing for automatically and objectively identifying root causes of cybersecurity events.

In some embodiments, S340 further includes incorporating translated entity-defining datasets into the entity graph. To this end, in such embodiments, S340 includes embedding translated data into the entity graph, and S340 may further include performing such translation. The entity-defining datasets provide explicit definitions of features of potential entities to be included in the entity graph. As a non-limiting example, such a dataset may be a schema of a DevOps tool (e.g., Terraform) that defines the function performed by each portion of the tool. Further incorporating such explicitly-defined features allows for further increasing the granularity of the graph, thereby further improving applications of said graph in identifying connections between cybersecurity event data and event logic components.

At S350, a semantic concepts dictionary is created. The semantic concepts dictionary may be populated with predetermined semantic concepts. The semantic concepts indicate potential characteristics of entities in the entity graph such as, but not limited to, type (e.g., "Docker container"), potential identifiers (e.g., an Internet Protocol address), build automation, configuration, portions thereof, combinations thereof, and the like. Such semantic concepts provide additional information regarding entities which may be used to improve the accuracy of root cause identification by providing additional identifying data for entities that can be queried. These semantic concepts indicating potential characteristics of entities may be included as nodes in the entity graph, or may be included in data of nodes of the entity graph.

At S360, a knowledge base is built. The knowledge base includes the entity graph and the semantic concepts dictionary.

Once built, the knowledge base can be queried as described herein (for example, as discussed with respect to FIGS. 2 and 6) in order to determine connections between software components and cybersecurity events or potential cybersecurity events, thereby providing context related to cybersecurity events and allowing for automatically suggesting remedial actions to address cybersecurity events based on such contexts.

It should be noted that the steps of FIG. 3 are depicted in a particular order, but that the steps are not necessarily limited to the order depicted. As a non-limiting example, the semantic concepts dictionary may be created before or in parallel with any of the steps S310 through S340 without departing from the scope of the disclosure.

Figure 4:
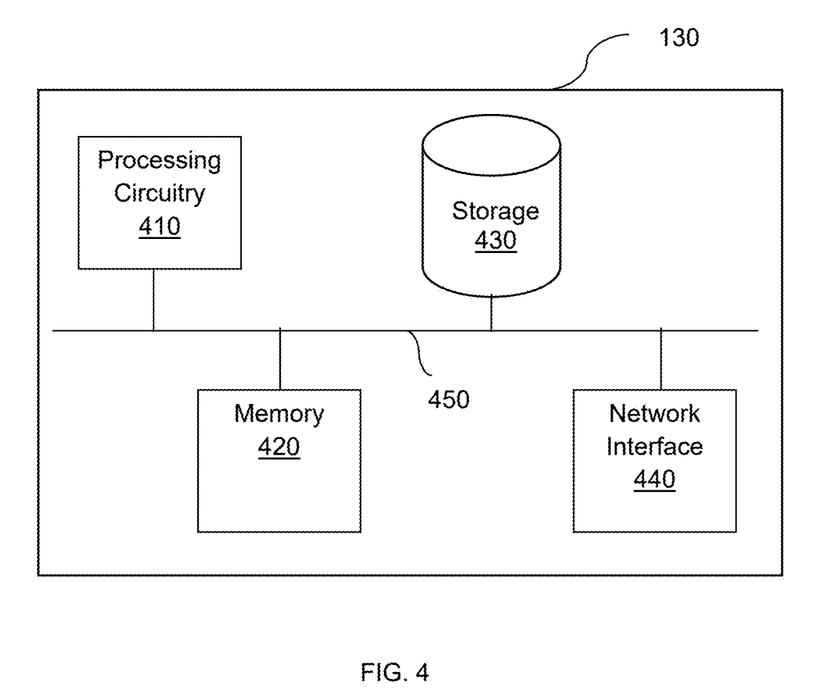
FIG. 4 is a schematic diagram of a cybersecurity event remediator according to an embodiment.

FIG. 4 is an example schematic diagram of a cybersecurity event remediator 130 according to an embodiment. The cybersecurity event remediator 130 includes a processing circuitry 410 coupled to a memory 420, a storage 430, and a network interface 440. In an embodiment, the components of the cybersecurity event remediator 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the cybersecurity event remediator 130 to communicate with, for example, the scanner 115, the knowledge base 120, both, and the like.

It should be understood that the embodiments described herein are not limited to the specific architecture illustrated in FIG. 4, and other architectures may be equally used without departing from the scope of the disclosed embodiments.

Figure 5:
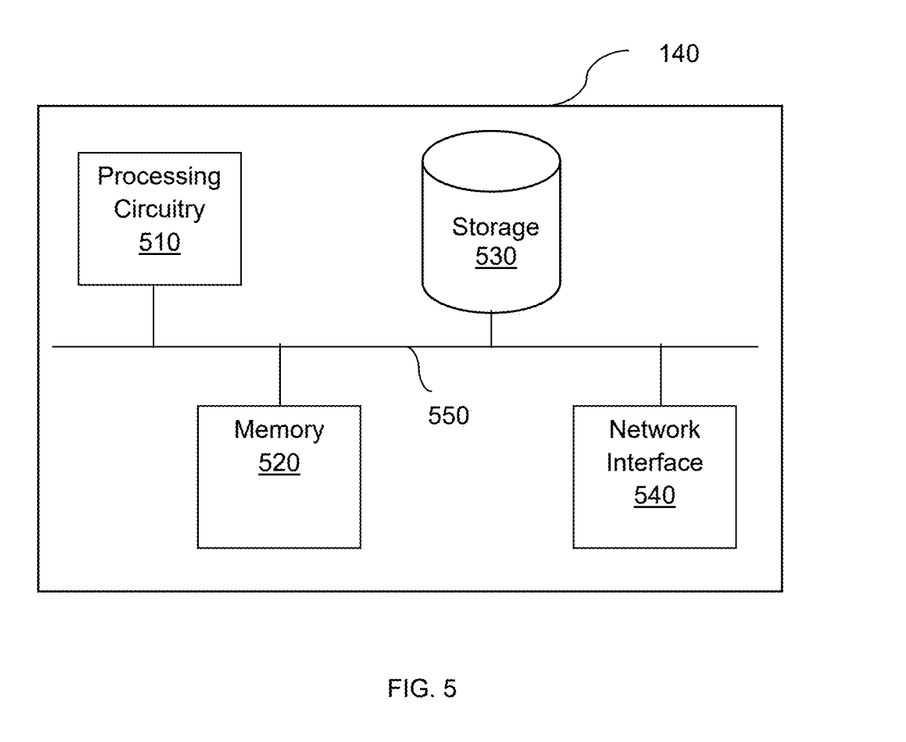
FIG. 5 is a schematic diagram of a knowledge base architect according to an embodiment.

FIG. 5 is an example schematic diagram of a knowledge base architect 140 according to an embodiment. The knowledge base architect 140 includes a processing circuitry 510 coupled to a memory 520, a storage 530, and a network interface 540. In an embodiment, the components of the knowledge base architect 140 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the knowledge base architect 140 to communicate with, for example, the production servers 112, the knowledge base 120, both, and the like.

It should be understood that the embodiments described herein are not limited to the specific architecture illustrated in FIG. 5, and other architectures may be equally used without departing from the scope of the disclosed embodiments.

Figure 6:
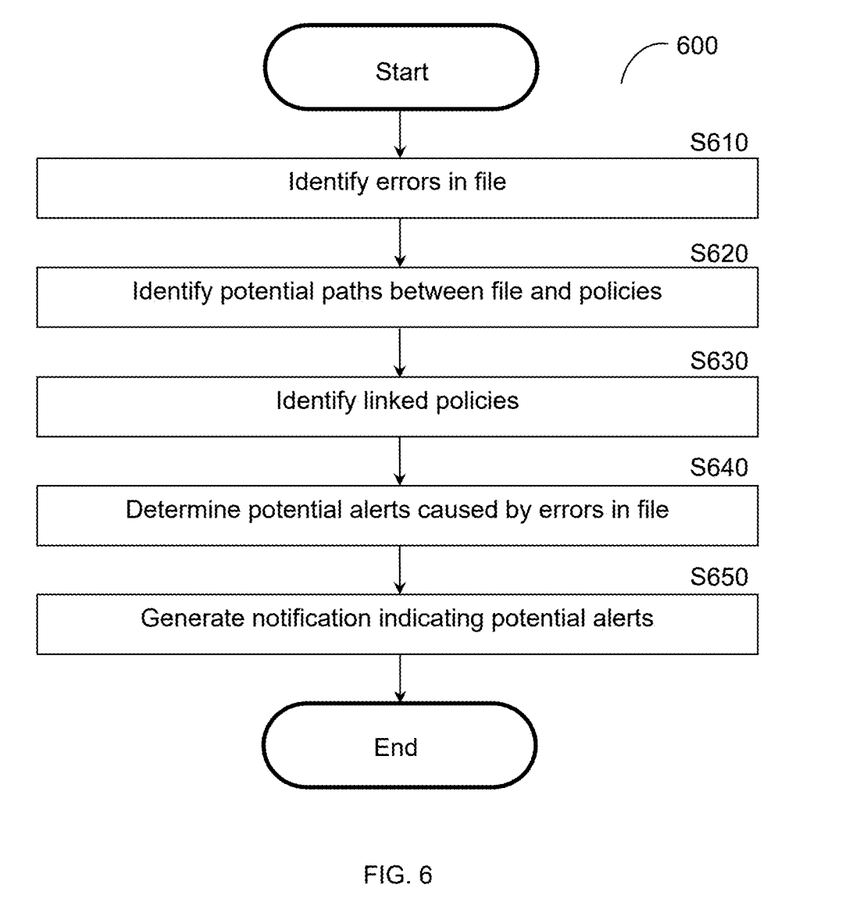
FIG. 6 is a flowchart illustrating a method for determining potential alerts based on infrastructure values and semantic concepts according to an embodiment.

FIG. 6 is a flowchart 600 illustrating a method for determining potential alerts based on entity-identifying values and semantic concepts according to an embodiment. In an embodiment, the method is performed by the knowledge base architect 140, FIG. 1.

At S610, errors in a file are identified. In an embodiment, the errors may be identified using one or more predetermined error-identifying rules.

At S620, potential paths between the file and one or more policies are identified. In an embodiment, the potential paths are identified by querying an entity graph (e.g., the entity graph 121, FIG. 1). Each identified path includes a series of edges connecting nodes of the entity graph. In a further embodiment, potential paths are explored by traversing the entity graph from an initial node (i.e., a node representing the file) to one or more end nodes (i.e., nodes which lack edges connecting to nodes that are not already part of the path being traversed). Because the entity graph as described above links domains between software components and policies, the end node for such traversals should be a policy which could be triggered by errors in the file.

At S630, one or more linked policies are identified based on the potential paths. In an embodiment, each linked policy is an end node encountered while traversing one of the potential paths.

At S640, potential alerts caused by errors in the file are determined based on the linked policies. In an embodiment, S640 may include determining correlations between the file (and, in particular, parts of the file containing errors) and content of the linked policies. By using the entity graph as described herein to identify policies which are logically linked to the file and correlating between those linked policies and the errors in the file, policies which could be invoked by the errors can be automatically and accurately identified. Consequently, potential alerts which could be triggered by those policies can be determined.

At S650, one or more proactive remedial actions are taken with respect to the determined potential alerts. The proactive remedial actions may include, but are not limited to, generating and sending a notification, annotating code, opening a ticket, combinations thereof, and the like. The notification may be sent, for example, to a user device (e.g., a user device of a user who is involved with software development for the software infrastructure). Accordingly, such notifications allow for proactively identifying potential issues in files and gaining insights into how those issues could affect other parts of the software infrastructure.

It should be noted that the methods described above are discussed as being performed by distinct systems depicted in the network diagram of FIG. 1 for example purposes, but that the functionality of those systems can be integrated into a single system without departing from the scope of the disclosure. As a non-limiting example, a system may include instructions for performing both the method of FIG. 2 as well as the method of FIG. 3.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for remediating cybersecurity events, comprising:
   creating a semantic concepts dictionary, wherein the semantic concepts dictionary defines a plurality of semantic concepts representing characteristics of software components;
   creating an entity graph based on a plurality of correlations between entities among a plurality of entities, wherein the entity graph has a plurality of nodes representing respective entities of the plurality of entities, wherein the plurality of entities includes a plurality of software components of a software infrastructure and a plurality of event logic components of cybersecurity event logic deployed with respect to the software infrastructure;
   building a knowledge base such that the knowledge base includes the semantic concepts dictionary and the entity graph;
   querying the knowledge base using a query generated based on at least one semantic concept and at least one entity-identifying value extracted from cybersecurity event data indicating a cybersecurity event for the software infrastructure, wherein the knowledge base returns at least one query result, wherein the query includes at least one semantic concept and at least one entity-identifying value; and
   performing at least one remedial action based on the at least one query result.

2. The method of claim 1, wherein creating the entity graph further comprises:
   embedding at least one entity-defining dataset into the entity graph, wherein each entity-defining dataset provides a plurality of explicit definitions of entity features.

3. The method of claim 1, wherein the plurality of nodes includes data indicating software component characteristics.

4. The method of claim 1, further comprising:
   identifying at least one path in the entity graph based on the at least one query result, wherein each identified path is between one of the plurality of software components and one of the plurality of event logic components; and
   identifying a root cause entity based on the identified at least one path, wherein the at least one remedial action is performed based further on the identified root cause entity.

5. The method of claim 1, further comprising:
   deriving the plurality of correlations by analyzing software development lifecycle pipeline data.

6. The method of claim 5, wherein the plurality of correlations is derived based on references between software components among the plurality of software components indicated in the software development lifecycle pipeline data.

7. The method of claim 1, further comprising:
   linking source code to binaries of at least one application based on the plurality of correlations between the entities among the plurality of entities, wherein the entity graph is created based further on the linking of the source code to the binaries.

8. The method of claim 1, wherein the plurality of correlations is identified based on an analysis of log files, wherein the analysis of the log files includes identifying at least one action and at least one event related to the at least one action indicated in a plurality of log files.

9. The method of claim 1, further comprising:
   performing natural language processing on the cybersecurity event data in order to identify the at least one semantic concept in the cybersecurity event data based on the plurality of semantic concepts defined in the semantic concepts dictionary; and
   extracting the identified at least one semantic concept from the cybersecurity event data.

10. A non-transitory computer readable medium having stored thereon instructions for causing a processing circuitry to execute a process, the process comprising:
    creating a semantic concepts dictionary, wherein the semantic concepts dictionary defines a plurality of semantic concepts representing characteristics of software components;
    creating an entity graph based on a plurality of correlations between entities among a plurality of entities, wherein the entity graph has a plurality of nodes representing respective entities of the plurality of entities, wherein the plurality of entities includes a plurality of software components of a software infrastructure and a plurality of event logic components of cybersecurity event logic deployed with respect to the software infrastructure;
    building a knowledge base such that the knowledge base includes the semantic concepts dictionary and the entity graph;
    querying the knowledge base using a query generated based on at least one semantic concept and at least one entity-identifying value extracted from cybersecurity event data indicating a cybersecurity event for the software infrastructure, wherein the knowledge base returns at least one query result, wherein the query includes at least one semantic concept and at least one entity-identifying value; and
    performing at least one remedial action based on the at least one query result.

11. A system for remediating cybersecurity events, comprising:
    a processing circuitry; and
    a memory, the memory containing instructions that, when executed by the processing circuitry, configure the system to:
    create a semantic concepts dictionary, wherein the semantic concepts dictionary defines a plurality of semantic concepts representing characteristics of software components;
    create an entity graph based on a plurality of correlations between entities among a plurality of entities, wherein the entity graph has a plurality of nodes representing respective entities of the plurality of entities, wherein the plurality of entities includes a plurality of software components of a software infrastructure and a plurality of event logic components of cybersecurity event logic deployed with respect to the software infrastructure;

build a knowledge base such that the knowledge base includes the semantic concepts dictionary and the entity graph;

query the knowledge base using a query generated based on at least one semantic concept and at least one entity-identifying value extracted from cybersecurity event data indicating a cybersecurity event for the software infrastructure, wherein the knowledge base returns at least one query result, wherein the query includes at least one semantic concept and at least one entity-identifying value; and perform at least one remedial action based on the at least one query result.

12. The system of claim 11, wherein the system is further configured to:

embed at least one entity-defining dataset into the entity graph, wherein each entity-defining dataset provides a plurality of explicit definitions of entity features.

13. The system of claim 11, wherein the plurality of nodes includes data indicating software component characteristics.

14. The system of claim 11, wherein the system is further configured to:

identify at least one path in the entity graph based on the at least one query result, wherein each identified path is between one of the plurality of software components and one of the plurality of event logic components; and identify a root cause entity based on the identified at least one path, wherein the at least one remedial action is performed based further on the identified root cause entity.

15. The system of claim 11, wherein the system is further configured to:

derive the plurality of correlations by analyzing software development lifecycle pipeline data.

16. The system of claim 15, wherein the plurality of correlations is derived based on references between software components among the plurality of software components indicated in the software development lifecycle pipeline data.

17. The system of claim 11, wherein the system is further configured to:

link source code to binaries of at least one application based on the plurality of correlations between the entities among the plurality of entities, wherein the entity graph is created based further on the linking of the source code to the binaries.

18. The system of claim 11, wherein the plurality of correlations is identified based on an analysis of log files, wherein the analysis of the log files includes identifying at least one action and at least one event related to the at least one action indicated in a plurality of log files.

19. The system of claim 11, wherein the system is further configured to:

perform natural language processing on the cybersecurity event data in order to identify the at least one semantic concept in the cybersecurity event data based on the plurality of semantic concepts defined in the semantic concepts dictionary; and extract the identified at least one semantic concept from the cybersecurity event data.

\* \* \* \* \*